United States Patent [19]

Eaton

[11] Patent Number: 4,782,481

[45] Date of Patent: Nov. 1, 1988

[54] APPARATUS AND METHOD FOR TRANSFERRING INFORMATION

[75] Inventor: Steven G. Eaton, Mt. View, Calif.

[73] Assignee: Hewlett-Packard Company, Palo Alto, Calif.

[21] Appl. No.: 17,400

[22] Filed: Feb. 24, 1987

[51] Int. Cl.⁴ .......................... H04J 3/02; H04J 25/38
[52] U.S. Cl. ........................................ 370/85; 370/91; 375/117
[58] Field of Search .................. 370/91, 49, 83, 82, 370/84, 79, 77, 110.1, 85; 375/117, 113

[56] References Cited

U.S. PATENT DOCUMENTS

| | | | |
|---|---|---|---|
| 3,906,484 | 9/1975 | Melvin, Jr. et al. | 375/117 |
| 4,045,614 | 8/1977 | Tahahata et al. | 375/117 |
| 4,282,600 | 8/1981 | Zemanek | 375/113 |
| 4,688,035 | 8/1987 | Gray et al. | 370/83 |

Primary Examiner—Douglas W. Olms
Assistant Examiner—Wellington Chin
Attorney, Agent, or Firm—William H. F. Howard; Saundra H. Hand; Edward Y. Wong

[57] ABSTRACT

A data bus and data bus protocol for transferring messages is presented. The bus and bus protocol eliminate the need for a separate reset line. The bus and bus protocol transmit messages and messages separators on the same line.

12 Claims, 2 Drawing Sheets

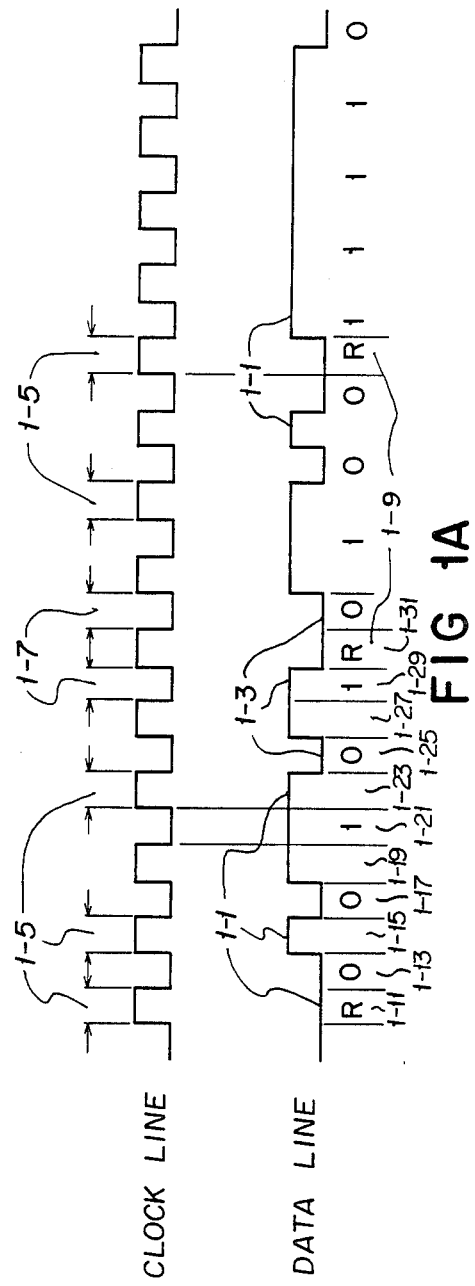

APPARATUS AND METHOD FOR TRANSFERRING INFORMATION

FIELD OF THE INVENTION

The invention relates to the field of information transfer. In particular, the invention relates to the field of data buses.

BACKGROUND OF THE INVENTION

Serial data buses send data bits on one line. Additional lines may be included for transmitting clock, handshaking, and reset signals that indicate, among other things, when the data line output has stabilized and is no longer switching from one state to another. Additionally, data buses use these lines to separate messages. The HPIB, a parallel data bus, has special lines to indicate the beginning and end of a message. Some serial data buses use a reset line to identify the beginning and end of message. Other serial data buses eliminate the reset lines by using a header/trailer scheme to identify new messages. One serial data bus combines the clock signal and data on one line and uses a separate reset line to identify the beginning and end of messages. Hardware is used to extract the clock signal. Once the clock signal is extracted it is used to extract the data. This scheme has the disadvantage of requiring extensive hardware to extract the clock signal from the data/clock line. Also this scheme requires a reset line.

A separate line for signaling the beginning of a new message has several disadvantages. In addition to the reset wire, hardware is needed to drive the wire, to send the information, and to receive the information. This additional hardware increases computer system cost and increases computer system failure rate. Using headers and trailers to identify the beginning and end of messages has the disadvantage of increasing the amount of time required to send a message and consuming bus bandwidth (where bandwidth is the maximum possible number of signal transitions per second). Headers and trailers have the further disadvantage of requiring the message to be encoded so that the header or trailer cannot occur in a message. Message encoding further decreases bus bandwidth.

SUMMARY OF THE INVENTION

The present invention signals the end of one message and the beginning of another without using a reset line or the header/trailer scheme. Message separators identify the end of one message and the beginning of another. The present invention transmits message separators and message data bits on the same line and in alternating fashion. The present invention transmits the messages separators during a first interval and message data bits during a second interval. The first and second intervals can be the first half cycle and second half cycle of a clock signal sent on a clock line. When the message separator has a first polarity, the message data bits following it continue an existing command. When the message separator has a second polarity, the message data bits following it begin a new message.

The present invention can be implemented as a precharged data bus. In this configuration, a bus master transmits the message separators during the first interval and the message data bits during the second interval to various bus slaves. When the bus master has sent a message to a bus slave giving the bus slave permission, the bus slave can also transmit message data bits during the second interval. However, only the bus master can transmit during the first interval. The bus master announces a new message by discharging the data line during the first interval. This produces message separators having a second polarity. The bus master announces the continuation of an existing message by precharging the data line during the first interval. This produces message separators having a first polarity.

The method and apparatus for transferring information according to the present invention has the advantage of requiring less hardware. The hardware reduction decreases system cost and failure rate. When the present invention is implemented as a precharged data bus, it obtains an unambiguous message separator without reducing the data rate or adding additional hardware. This unambiguous message separator results from the bus master's exclusive control of the data line during message separator transmission. If any erroneous bus operation occurs when the message data bits are sent, the erroneous operation can be stopped by the bus master sending a message separator of the second polarity. Additionally, when the present invention is implemented as a precharged data bus, it obtains the benefits of a precharged data bus. These benefits arise because only the bus master can send message separators. The benefits include reduced bus contention, reduced hardware wince only the bus master sends message separators, and reduced bus capacitance. The bus capacitance is reduced because the bus slave's bus driving circuitry only needs to be able to discharge the bus. The reduced bus capacitance allows the bus to run as much as three times faster.

BRIEF DESCRIPTION OF THE DRAWINGS

FIG. 1 shows the transmission of messages and message separators according to the preferred embodiment of the present invention.

FIG. 1B shows the transmission of message and message separators according to an alternate embodiment of the invention.

DETAILED DESCRIPTION OF THE INVENTION

Figure 2:
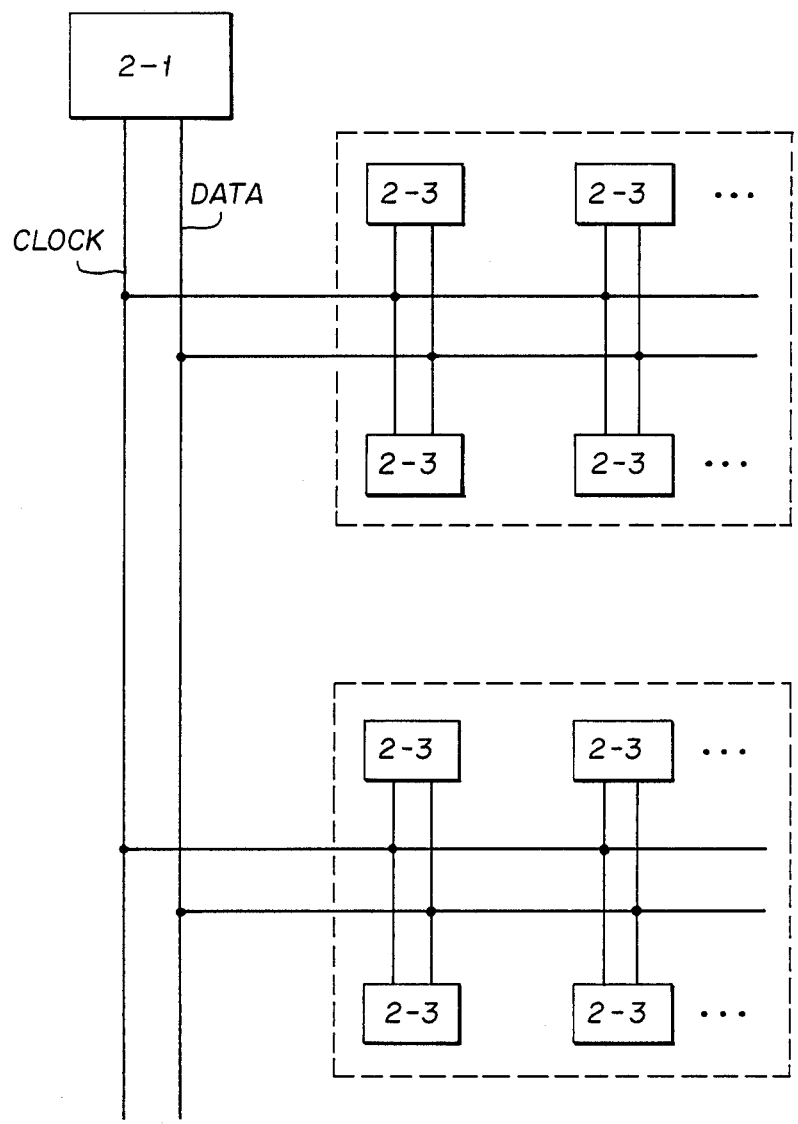
FIG. 2 shows an apparatus that transmits messages and message separators according to the preferred embodiment of the present invention.

This description assigns two part numbers to the elements. The first part refers to the figure number and the second part refers to the element.

The method according to the preferred embodiment of the present invention sends message data bits 1-3 and message separators 1-1, 1-9 on the same precharged data line. The message separators 1-1, 1-9 are transmitted during the first interval 1-5 and the message data bits 1-3 are transmitted during the second interval 1-7. The clock signal creates the first interval 1-5 and the second interval 1-7.

The precharged data line, in accordance with the preferred embodiment of the invention, is shown in FIG. 1A. When continuing a message, the precharged data line is precharged during the first interval 1-5 to produce the message separator 1-1 having a first polarity. When beginning a new message, the precharged data line is discharged during the second interval 1-1 to produce the message separator 1-9 having a second polarity. Message data bits 1-3 are always sent during the second interval 1-7. Thus, in the preferred embodiment of the invention, one message separator 1-1 is sent for each message data bit 1-3.

The method and apparatus according to the preferred embodiment of the invention is implemented in a system similar to that shown in FIG. 2. FIG. 2 represents a memory system with a block memory architecture described in U.S. patent application, *High Yield Semiconductor Memory Devices*, Ser. No. 847,411, filed on Apr. 3, 1986 and incorporated herein by reference. This memory system has a memory system controller 2-1 and numerous memory block controllers 2-3. Each memory block controller 2-3 controls a block of memory. The memory system controller 2-1 controls all of the memory block controllers 2-3. In the preferred embodiment of the present invention, the precharged data line and clock line are connected between the memory system controller 2-1 and the memory block controllers 2-3. The memory system controller 2-1 is the bus master and the memory block controllers 2-3 are the bus slaves. Only the bus master, the memory system controller 2-1, can precharge the data line during the first interval 1-5 to create the message separators 1-1. If this memory system has six different commands, then three bits are required to identify the commands. FIG. 1A shows the transmission of a message separator 1-11 having a second polarity. This message separator 1-11 identifies the beginning of a new message, a reset. The following message data bit 1-13 is a zero and is followed by a message separator 1-15 of the first polarity which signifies the continuation of the present message. The next two message data bits 1-17 and 1-21 0 and 1 complete the command 001. The two message data bits 1-25 and 1-29 are the data. The data is followed by a message separator 1-31 having a second polarity that identifies the end of the present message and the beginning of the next command.

The apparatus, according to the present invention, can be constructed by connecting a data line between the bus master and the bus slaves. The bus master and bus slave used by the present invention are similar to those used in other buses. A clock line can be connected between the bus master and bus slaves. The clock can be of the type commonly used in other buses.

I claim:

1. A method for transferring a plurality of data messages comprised of a plurality of data bits, the data messages including a first data message comprising a plurality of first data bits and a second data message comprising a plurality of second data bits, the method comprising the steps of:
    (a) sending over a clock line a clock signal comprising a plurality of periodic single clock cycles, with each of the single clock cycles alternating between a first clock interval and a second clock interval;
    (b) sending over a data line a message classifier bit during the first clock interval, the message classifier but indicating that a data bit is one of a first data bit of a first data message and a second data bit of a second data message;
    (c) sending over the data line a message data bit during the second clock interval, the message data bit being one of a first data bit of the first data message and a second data bit of a new data message; and
    (d) alternately sending during each single clock cycle the message classifier bit and the message data bit on the same data line.

2. The method defined in claim 1, further comprising the steps of:
    (a) signaling the continuation of a first data bit representing an old data message when the message classifier bit has a first polarity; and
    (b) signaling the beginning of a second data bit representing the beginning of a new data message when the message classifier bit has a second polarity.

3. The method defined in claim 2, further comprising the steps of:
    (a) using the first half of the single clock cycle for the first interval; and
    (b) using the second half of the single clock cycle for the second interval.

4. The method defined in claim 2, further comprising the steps of:
    (a) transmitting each of the message classifier bits and the message data bits on a data line capable of being precharged and discharged;
    (b) precharging the data line during the first clock interval to transmit a message classifier bit that signals the continuation of a present data message as represented by the presence of one of another of a first data bit in a series of first data bits and another of a second data bit in a series of second data bits; and
    (c) discharging the data line during the first clock interval to transmit a message classifier bit that signals the beginning of a new message as represented by a change from one of a first data bit to a second data bit and a second data bit to a first data bit.

5. The method defined in claim 4, further comprising the steps of:
    (a) beginning the transmission of the new message during the second interval when the message classifier bit has the second polarity; and
    (b) continuing the transmission of the present message during the second interval when the message classifier has the first polarity.

6. An apparatus for transferring a stream of data messages, each of which includes at least one data message bit, the stream of data messages including (1) at least one old message having at least one old message bit representing a continuation of a data message now being transferred, and (2) at least one new message having at least one new message bit representing a new message to be sent following the sending of the old message, the apparatus comprising:
    (a) a first means, formed for generating a plurality of interval designators for dividing a timing signal including timing signal bits into a plurality of each of an alternating first time interval and a second time interval;
    (b) a second means, formed for generating a plurality of message classifier bits including at least a first message classifier bit and a second message classifier bit, the message classifier bits being selectively used to classify data message bits as being one of a continuation of an old message and a beginning of a new message, with each message classifier bit being generated for transmission during the first time interval
    (c) a third means, formed for alternately carrying the message classifier bits during the first time interval and the data message bits during the second time interval, the transmission of the message classifier bits and the data message bits being synchronized to be in time with the timing signal; and (d) a fourth means, coupled to communicate with the timinig signal bits, the message classifier bits, and the data message bits, the fourth means thus being informed by and dependent upon the second means to be informed as to whether each incoming data bit is one of and old message bit and therefore a part of an old data message and a new message bit and therefore a beginning of a new data message.

7. The apparatus defined in claim 6, wherein: the first means is a clock including a clock line over which the timing signals are transmitted.

8. The apparatus defined in claim 6, wherein: the second means is a bus master.

9. The apparatus defined in claim 8, wherein the bus master one of:
   (a) precharges the third means during the first time interval to produce a message classifier bit having a first polarity; and
   (b) discharges the third means during the first time interval to produce a message classifier bit having a second polarity.

10. The apparatus defined in claim 8, further comprising: a bus slave;
    (a) connected to the data line for receiving the message classifier bits and the message data bits;
    (b) connected to the clock line to receive the timing signal bits; and
    (c) connected so all bits are synchronized by the first means so the bus slave is informed over the single data line that (1) the first bit classifies the next incoming data bit as one of a part of an old message and the beginning of a new message, and (2) the second bit is actually a data bit belonging to the message identified as one of an old message and a new message.

11. An apparatus for transmitting data signal bits, message separator signal bits, and clock signal bits between a bus master and slave device, the apparatus comprising:
    (a) a data line;
    (b) a bus master:
       (1) coupled for transmitting a clock signal with periodic cycles comprising a first clock interval and a second clock interval;
       (2) coupled for transmitting and receiving a data stream of data bits;
       (3) formed for looking at each data bit and determining if a next data bit is part of one of a previous data signal and a next data signal, and in response one of:
          (i) precharging the data line during the first clock interval if the next data bit is from the previous data signal, thus producing a message continuation bit that identifies the data bit being sent as being part of the previous data signal, and then one of sending and receiving the next data bit over the data line during the second clock interval; and
          (ii) discharging the data line during the first clock interval if a next data bit is from a next data signal, thus producing a message separator bit that identifies the data bit being sent as being part of the next data signal, and then one of sending and receiving the next data bit over the data line during the second clock interval; and
    (c) a slave device:
       (1) coupled to receive the clock signal bits;
       (2) coupled to receive the message continuation bits and the message separator bits;
       (3) coupled to send and receive the data signal bit; and
       (4) coupled with the result that the slave device:
          (a) by alternately receiving, during one of the the first clock cycle and the second clock cycle, one of a message continuation bit and a message separator bit; and
          (b) by alternately receiving, during the the other of the first clock cycle and the second clock cycle, a data signal bit which is one of part of the previous data signal and the continuation data signal;
       is synchronized by the bus master to cooperate with the bus master in processing the data signal bits alternately sent during one of the first clock interval and the second clock interval, thus causing every other data bit to be smapled to determine if each data bit is one of the previous data message and the next data message.

12. An apparatus for transmitting a plurality of data signals, message separator signals, and clock signals between a bus master and at least one slave device, the apparatus comprising:
    (a) a clock line;
    (b) a data line, capable of being one of charged to a first level and discharged to a second level;
    (c) a bus master:
       (1) coupled for transmitting over the clock line a clock signal having a plurality of single cycles, with each single cycle being divided into a first clock interval and a second clock interval;
       (2) coupled for transmitting and receiving over the data line a data stream comprising a plurality of discrete data signals;
       (3) formed for looking at each data bit of each data signal and determining if the next data bit is part of a next data signal , and in response one of:
          (i) precharging the data line during the first clock interval if the next data bit is from the previous data signal, thus producing a message continuation bit indicating that the data bit being sent is part of the previous data signal, and then one of sending and receiving the next data bit over the data line during the second clock interval; and
          (ii) discharging the data line during the first clock interval if the next data bit is from the next data signal, thus producing a message separator bit indicating that the data bit being sent is part of the next data signal, and then one of sending and receiving the next data bit over the data line during the second clock interval; and
    (d) a slave device:
       (1) coupled to receive from the clock line the clock signals;
       (2) coupled to receive from the data line the message continuation bits and the message separator bits;
       (3) coupled to the data line to send and receive the data signals; and
       (4) coupled with the result that the slave device is synchronized by the bus master to cooperate with the bus master in processing the data signals sent.

* * * * *

UNITED STATES PATENT AND TRADEMARK OFFICE
CERTIFICATE OF CORRECTION

PATENT NO.   :   4,782,481
DATED        :   Nov. 1, 1988
INVENTOR(S)  :   Steven G. Eaton It is certified that error appears in the above-identified patent and that said Letters Patent is hereby corrected as shown below:

Column 2, line 28, "wince" should be --since--;

Column 3, line 57, "but" should be --bit--;

Column 6, line 19, "smapled" should be --sampled--.

Signed and Sealed this

Second Day of January, 1990

*Attest:*

JEFFREY M. SAMUELS

*Attesting Officer*     *Acting Commissioner of Patents and Trademarks*